(12) United States Patent
Han et al.

(10) Patent No.: US 11,393,081 B2
(45) Date of Patent: Jul. 19, 2022

(54) METHOD AND APPARATUS FOR PROCESSING THERMAL IMAGE

(71) Applicant: HANWHA TECHWIN CO., LTD., Seongnam-si (KR)

(72) Inventors: Seung Jin Han, Seongnam-si (KR); Geon Hyoung Lee, Seongnam-si (KR); Byung Joon Song, Seongnam-si (KR); Han Seok Seo, Seongnam-si (KR); Bo A Jung, Seongnam-si (KR); Jin Wook Huh, Seongnam-si (KR); Ki Rim Lee, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 65 days.

(21) Appl. No.: 16/423,786

(22) Filed: May 28, 2019

(65) Prior Publication Data

US 2020/0226728 A1 Jul. 16, 2020

(30) Foreign Application Priority Data

Jan. 11, 2019 (KR) .................. 10-2019-0003713

(51) Int. Cl.
*G06T 5/40* (2006.01)
*G06T 7/00* (2017.01)

(52) U.S. Cl.
CPC ............. *G06T 5/40* (2013.01); *G06T 7/0002* (2013.01); *G06T 2207/10048* (2013.01); *G06T 2207/30168* (2013.01)

(58) Field of Classification Search
CPC ............... G06T 5/40; G06T 7/0002; G06T 2207/30168; G06T 2207/10048
See application file for complete search history.

(56) References Cited

U.S. PATENT DOCUMENTS

| 2009/0087092 | A1* | 4/2009 | Min | G06T 5/40 |
| | | | | 382/169 |
| 2017/0264970 | A1* | 9/2017 | Mitra | H04N 21/4858 |
| 2018/0211371 | A1* | 7/2018 | Liu | G06T 5/40 |

FOREIGN PATENT DOCUMENTS

| CN | 104252695 | * 12/2014 |
| CN | 109523477 | * 11/2018 |

OTHER PUBLICATIONS

Machine translation for CN 109523477 (Year: 2018).*
Machine translation for CN 104252695 (Year: 2014).*

* cited by examiner

*Primary Examiner* — Qian Yang
(74) *Attorney, Agent, or Firm* — Sughrue Mion, PLLC

(57) ABSTRACT

Disclosed herein is a method and apparatus for processing a thermal image. The method includes: performing histogram stretching on thermal image data of the thermal image; and adjusting a histogram stretching scale for thermal image data of a next frame using histogram data of the thermal image data on which the histogram stretching is performed. As a result, it is possible to mitigate that an image becomes less recognizable as thermal image data is deteriorated or saturated.

18 Claims, 8 Drawing Sheets
(2 of 8 Drawing Sheet(s) Filed in Color)

METHOD AND APPARATUS FOR PROCESSING THERMAL IMAGE

CROSS-REFERENCE TO THE RELATED APPLICATION

This application claims priority from Korean Patent Application No. 10-2019-0003713 filed on Jan. 11, 2019 in the Korean Intellectual Property Office, the disclosure of which is incorporated herein by reference in its entirety.

BACKGROUND

1. Field

Apparatuses and methods consistent with the exemplary embodiments of the inventive concept relate to processing a thermal image, and more particularly, to processing a thermal image that adjust a histogram stretching scale depending on whether the image is deteriorated or saturated.

2. Description of the Related Art

Sometimes, it may be difficult to perform surveillance in a surveillance system only with typical cameras. Recently, surveillance systems employ a thermal camera solely or in combination with typical cameras.

When a thermal camera is employed instead of a typical camera depending on the surveillance environment or the purpose of surveillance, it is necessary to process thermal image data so that a user can use it. The thermal image data may be subjected to histogram equalization, histogram stretching, plateau equalization, and the like, so that an image that can be used by a user can be output.

In case of monitoring an outdoor area where temperature changes are frequency and an exceptional situation such as rain and snow occurs, there is a problem that the quality of an image is greatly influenced due to the characteristics of the thermal image data. Therefore, what is required is a technique that can quickly cope with changes in the surrounding environment to address problems such as deterioration and saturation.

SUMMARY

Exemplary embodiments of the inventive concept provide a method for processing a thermal image that adjusts a histogram stretching scale depending on whether an image is deteriorated or saturated.

The exemplary embodiments also provide an apparatus for processing a thermal image that adjusts a histogram stretching scale depending on whether an image is deteriorated or saturated.

According to an aspect of exemplary embodiments, there is provided a method for processing a thermal image which may include: performing histogram stretching on thermal image data of the thermal image; and adjusting a histogram stretching scale for thermal image data of a next frame using histogram data of the thermal image data on which the histogram stretching is performed.

The adjusting the histogram stretching scale may include: determining whether the thermal image data is deteriorated or saturated using the histogram data of the thermal image data; and adjusting the histogram stretching scale if it is determined that the thermal image data is deteriorated or saturated. The adjusting the histogram stretching scale may include: increasing the histogram stretching scale if it is determined that the thermal image data is deteriorated, and decreasing the histogram stretching scale if it is determined that the thermal image data is saturated.

The determining whether the thermal image data is deteriorated or saturated may include comparing a minimum value of the histogram data of the thermal image data with threshold values. The determining whether the thermal image data is deteriorated or saturated may include determining that the thermal image data is deteriorated if the minimum value is below a deterioration threshold value, and determining that the thermal image data is saturated if the minimum value is above a saturation threshold value.

The adjusting the histogram stretching scale may be performed at every predetermined number of frames or at a predetermined interval. The adjusting the histogram stretching scale may include adjusting the histogram stretching scale with a predetermined scale.

According to another aspect of the exemplary embodiments, there is provided an apparatus for processing a thermal image which may include at least one processor to implement: a histogram stretching unit configured to perform histogram stretching on thermal image data of the thermal image; and a histogram stretching scale adjusting unit configured to adjust a histogram stretching scale for thermal image data of a next frame using histogram data of the thermal image data on which the histogram stretching is performed.

According to yet another aspect of the exemplary embodiments, there is provided an apparatus for processing a thermal image which may include: a receiver configured to receive thermal image data; at least one processor to implement a histogram stretching unit configured to perform histogram stretching on the thermal image data; and a transmitter configured to output an image on which the histogram stretching has been performed, wherein the histogram stretching unit adjusts a histogram stretching scale for thermal image data of a next frame using histogram data of the thermal image data after the histogram stretching has been performed thereon.

Other aspects of the exemplary embodiments will be described in the detailed description with reference to the accompanying drawings.

According to the exemplary embodiments, at least following effects can be achieved. It is possible to mitigate thermal image data from becoming less recognizable as it is deteriorated or saturated. It should be noted that effects of the inventive concept is not limited to those described herein and other effects of the inventive concept will be apparent to those skilled in the art from the following descriptions.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects and features of the inventive concept will become more apparent by describing in detail exemplary embodiments thereof with reference to the attached drawings, in which.

DETAILED DESCRIPTION OF THE EXEMPLARY EMBODIMENTS

Figure 1:
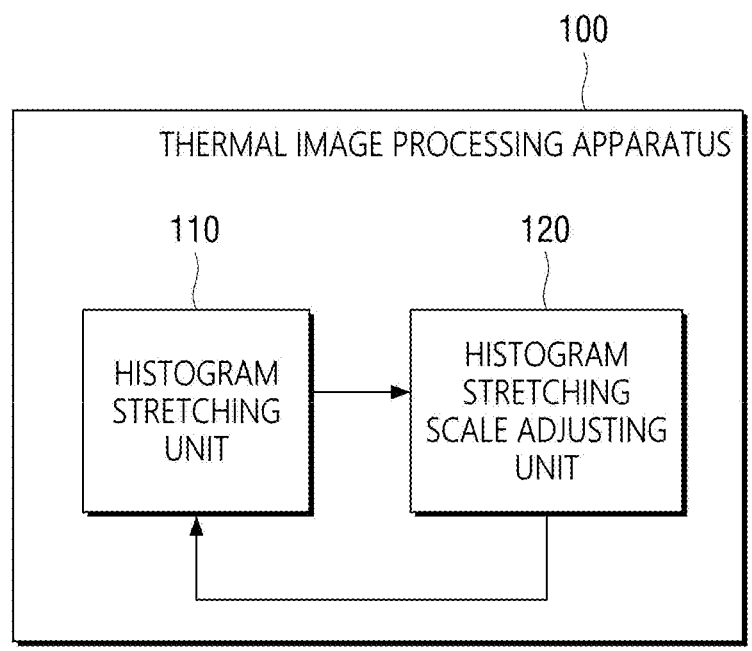
FIG. 1 is a block diagram of a thermal image processing apparatus according to an exemplary embodiment.

Advantages and features of the inventive concept will become apparent from the descriptions of exemplary embodiments hereinbelow with reference to the accompanying drawings. However, the inventive concept is not limited to the exemplary embodiments disclosed herein but may be implemented in various different ways. The exemplary embodiments are provided for making the inventive concept thorough and for fully conveying the scope of the inventive concept to those skilled in the art. It is to be noted that the scope of the inventive concept is defined only by the claims. Like reference numerals denote like elements throughout the descriptions.

Unless otherwise defined, all terms (including technical and scientific terms) used herein have the same meaning as commonly understood by one of ordinary skill in the art to which the exemplary embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the embodiments rather than limiting the inventive concept. As used herein, the singular forms are intended to include plural forms as well, unless the context clearly indicates otherwise. Throughout this specification, the word "comprise" and variations such as "comprises" or "comprising," will be understood to imply the inclusion of stated elements but not the exclusion of any other elements.

FIG. 1 is a block diagram of a thermal image processing apparatus according to an exemplary embodiment.

The thermal image processing apparatus 100 according to the exemplary embodiment includes a histogram stretching unit 110 and a histogram stretching scale adjusting unit 120, and may further include a receiver and a transmitter.

The histogram stretching unit 110 performs histogram stretching on thermal image data.

Histogram stretching is performed for outputting a better thermal image. When brightness values of image pixels are concentrated in a particular brightness region of a thermal image, i.e., when a histogram is distributed only in a particular brightness value range, the histogram stretching is performed to spread the histogram to increase the visibility.

Performing histogram stretching on a thermal image data and performing histogram stretching with an appropriate scale on the thermal image data are closely related to the visibility of the thermal image data.

Figure 2A:
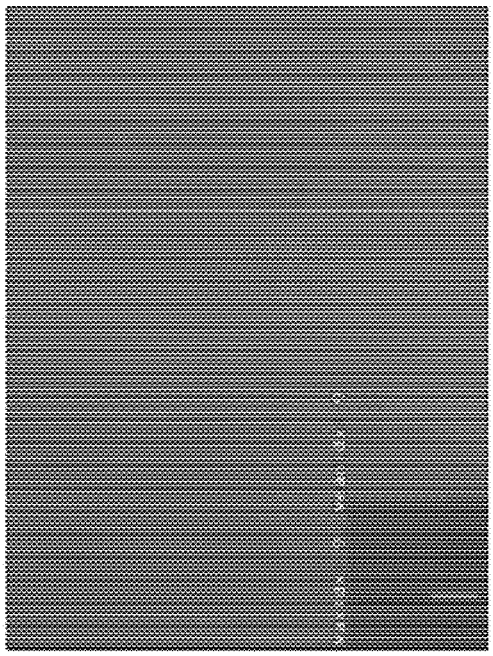
FIGS. 2A-2D and 3A-3B are views for showing thermal images and histogram data according to histogram stretching scales.
Figure 2B:
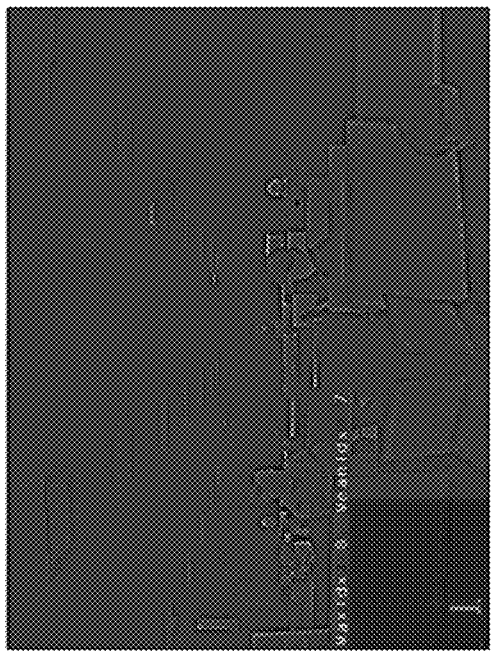
Figure 2C:
Figure 2D:

FIGS. 2A-2D show pictures for comparing visibilities of a thermal image by applying histogram stretching with different histogram stretching scales. FIG. 2A is a picture when no histogram stretching is performed. FIG. 2B is a picture when histogram stretching is performed with a lowest level. In FIG. 2B, the outlines of objects on the thermal data are clear due to histogram stretching. FIG. 2C is a picture when histogram stretching is performed with a level of 80. FIG. 2D is a picture when histogram stretching is performed with a level of 160. FIGS. 2A-2D show that visibilities can be improved by performing histogram stretching, and can be further improved by performing the histogram stretching with at a suitable histogram stretching scale.

Figure 3A:
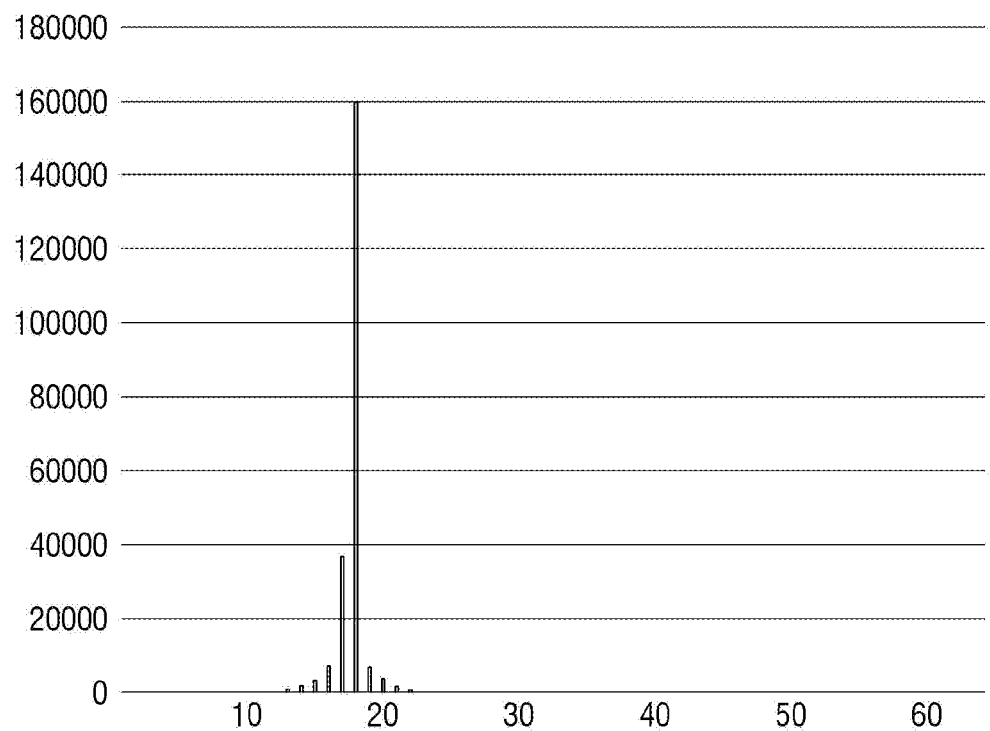
Figure 3B:
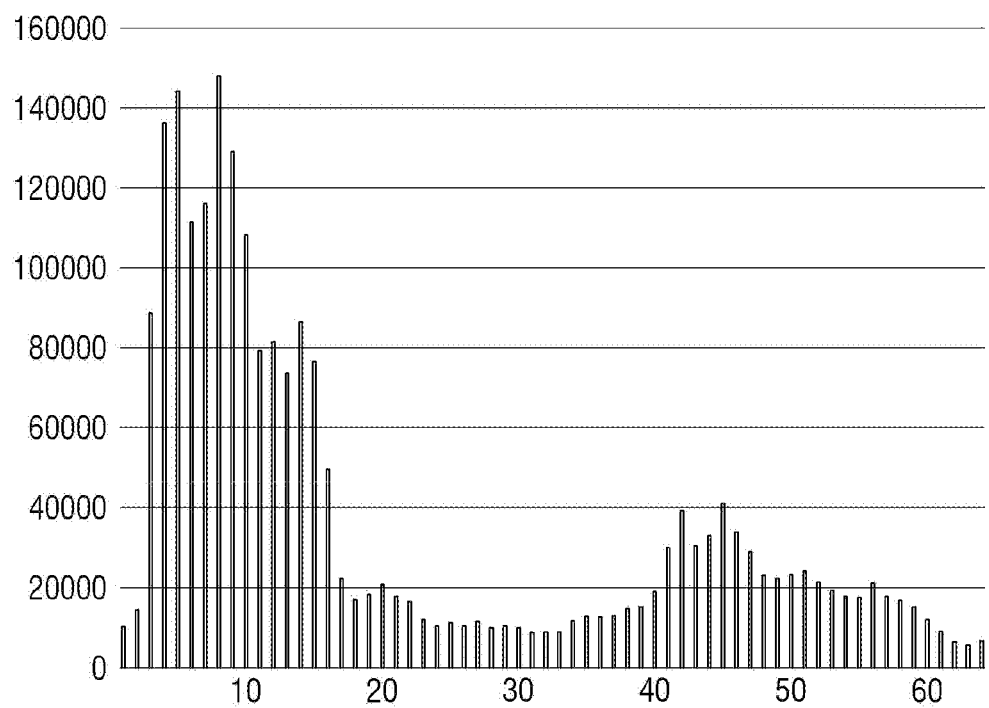

FIG. 3A is a graph showing histogram distribution of FIG. 2A where no histogram stretching is performed. FIG. 3B is a graph showing histogram distribution of FIG. 2D where histogram stretching is performed with a suitable histogram stretching scale. FIG. 3A shows that histogram is distributed at particular brightness values. In contrast, FIG. 3B shows that histogram is generally distributed.

For the above-described reason, in order to increase visibility of a thermal image, the histogram stretching unit 110 performs histogram stretching on thermal image data.

The histogram stretching scale adjusting unit 120 adjusts a histogram stretching scale on the thermal image data of a next frame using histogram data of the thermal image data on which the histogram stretching has been performed.

When the histogram stretching unit 110 performs the histogram stretching on the thermal image data, a predetermined level or a level set by a user may be used as a histogram stretching scale, or a previous histogram stretching scale may be used. However, since a brightness value of thermal image data changes depending on a temperature change of an area to be captured by a thermal image capturing device, the thermal image data may be deteriorated or saturated when a fixed histogram stretching scale is used. Therefore, it is possible to prevent the thermal image data from being deteriorated or saturated by adjusting the histogram stretching scale according to the thermal image data.

The histogram stretching scale adjusting unit 120 determines whether thermal image data is deteriorated or saturated using histogram data of the thermal image data on which the histogram stretching has been performed. If it is determined that the thermal image data is deteriorated or saturated, the histogram stretching scale may be adjusted. In order to determine whether it is necessary to adjust the histogram stretching scale, the histogram stretching scale adjusting unit 120 determines whether the thermal image data is deteriorated or saturated by using the histogram data of the thermal image data.

In order to determine whether thermal image data is deteriorated or saturated, the histogram stretching scale adjusting unit 120 uses the minimum value (min) of the histogram data of the thermal image data. That is to say, the histogram stretching scale adjusting unit 120 determines whether the thermal image data is deteriorated or saturated by comparing the minimum value (min) of the histogram data of the thermal image data with threshold values. As used herein, the minimum value refers to the smallest frequency value among the histogram frequencies having non-zero values. In order to exclude errors or insignificant histogram frequencies, the minimum value may be set to the smallest frequency among the frequencies higher than a predetermined frequency. Referring to FIG. 3B, the minimum value representing the smallest frequency among the all frequencies of the histogram is one indicated by the second rightmost bar which is the smallest bar. It is determined whether the thermal image data is deteriorated or saturated with respect to the minimum value.

The histogram stretching scale adjusting unit 120 determines that the thermal image data is deteriorated if the minimum value is below a deterioration threshold value, and determines that the thermal image data is saturated if the minimum value is above the saturation threshold value. When the minimum value is below the deterioration threshold value, it is determined that deterioration has occurred. An image is deteriorated when temperature distribution is narrow, and thus, the contrast is reduced, whereby the image is less recognizable. That is, when histogram stretching is performed with a current histogram stretching scale, a histogram frequency is concentrated only on particular brightness values, and thus, the image is less recognized. Such situation may occur when the minimum value is too low. Therefore, it can be determined that the thermal image data has been deteriorated when the minimum value is below the deterioration threshold value.

In contrast, when the minimum value is above a saturation threshold value, it is determined that the image is saturated. An image is saturated when the temperature distribution is wide, whereby a screen is saturated. That is, when histogram stretching is performed with the current histogram stretching scale, the frequency becomes increased at most of the brightness values. Such saturation occurs when the minimum value is too high. Therefore, it can be determined that the thermal image data has been saturated when the minimum value is above the saturation threshold value.

For example, it may be determined that the thermal image data is saturated if the minimum value is equal to or greater than the histogram frequency of 1,000. It may be determined that the thermal image data is deteriorated if the minimum value is equal to or less than the histogram frequency of 100.

The histogram stretching scale adjusting unit 120 increases the histogram stretching scale when the thermal image data is deteriorated, and decreases the histogram stretching scale when the thermal image data is saturated. If the thermal image data according to the current histogram stretching scale is deteriorated or saturated, the image is less recognizable, and therefore, it is necessary to appropriately adjust the histogram stretching scale. When the thermal image data is deteriorated, the minimum value is below the deterioration threshold value, and thus the histogram stretching scale is increased so that the minimum value becomes larger than the deterioration threshold value. That is, by including brightness values in a narrower range only, the frequency difference versus the brightness value is increased.

On the contrary, when the thermal image data is saturated, the minimum value is above the deterioration threshold value, and thus the histogram stretching scale is decreased so that the minimum value becomes smaller than the saturation threshold value. That is, by including brightness values in a wider range, the frequency difference versus the brightness value is increased.

Figure 4A:
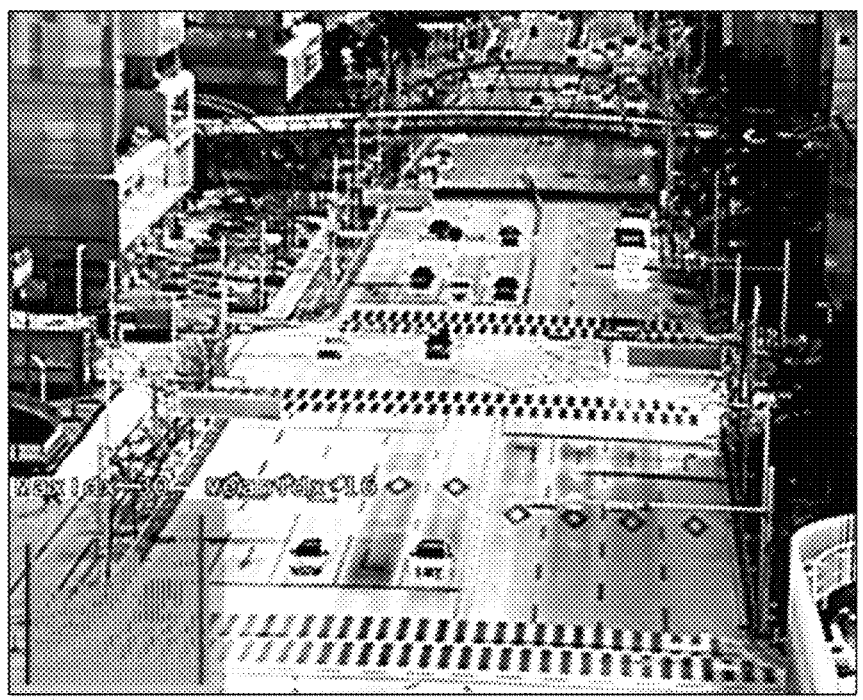
FIGS. 4A-4B are views for illustrating a change of a thermal image according to a thermal image processing according to an exemplary embodiment.
Figure 4B:
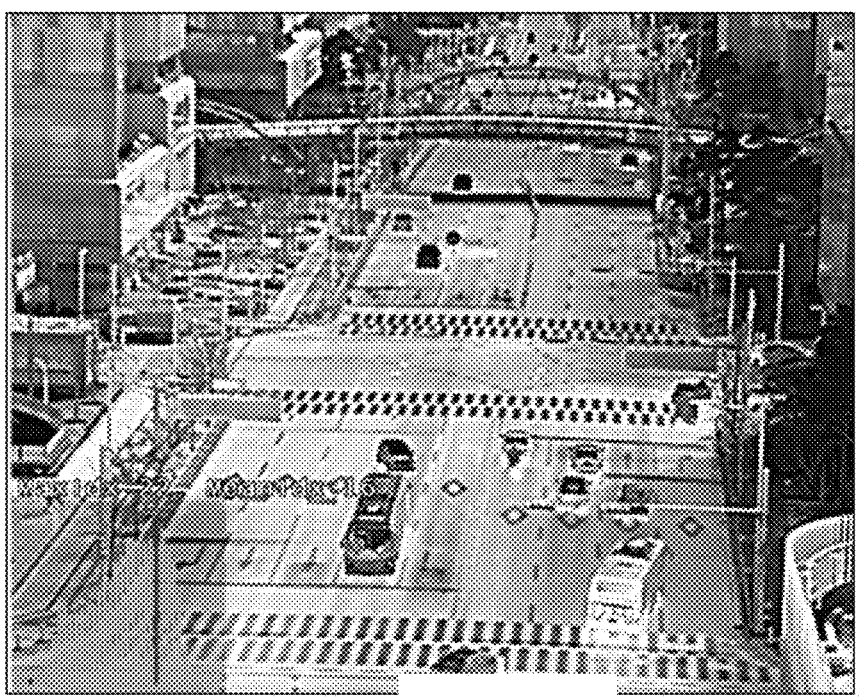

As shown in FIG. 4A, when the minimum value of the histogram data of the thermal image data according to the current histogram stretching scale is above the saturation threshold value, the thermal image data is saturated, and it is difficult to recognize objects from the thermal image data. Accordingly, in order to increase the visibility of the saturated picture shown in FIG. 4A, the histogram stretching scale is decreased so that a histogram having a low frequency is also included. By doing so, the image can be adjusted to an improved image shown in FIG. 4B, in which the visibility of the image is improved.

The histogram stretching scale adjusting unit 120 may adjust the histogram stretching scale by increasing or decreasing it between the maximum scale and the minimum scale. A problem may arise if the histogram stretching scale is increased or decreased too much. If the histogram stretching scale is increased too much, a large amount of noise may be included. Accordingly, the histogram stretching scale can be adjusted within an appropriate range in processing thermal image data depending on the environment or purpose of applying the thermal image data.

The histogram stretching scale adjusting unit 120 may determine whether the thermal image data is deteriorated or saturated at every predetermined number of frames or a predetermined interval. The histogram stretching scale adjusting unit 120 may adjust the histogram stretching scale by determining whether the thermal image data is deteriorated or saturated for each frame. Alternatively, the histogram stretching scale adjusting unit 120 may adjust the histogram stretching scale by determining whether the thermal image data is deteriorated or saturated for a predetermined frame number or a predetermined interval. The interval or frame number may very depending on the temperature change in the environment where the thermal image data is generated. It may be determined at each frame or a shorter interval in the environment where the temperature changes rapidly. It may be determined at a longer interval in the environment where the temperature changes slowly.

The histogram stretching scale adjusting unit 120 adjusts the histogram stretching scale of the thermal image data of a next frame when adjusting the histogram stretching scale. Since the histogram data of the thermal image data already subjected to the histogram stretching is used to determine whether the image is deteriorated or saturated, the histogram stretching scale, which is adjusted in accordance with deterioration or saturation, is applied to the next frame. That is, the histogram stretching scale may be adjusted as the histogram stretching unit 110 receives a feedback signal.

The histogram stretching scale adjusting unit 120 may adjust the histogram stretching scale with a predetermined stretching scale. If the histogram stretching scale is adjusted very precisely, it may take a long time because there are many scales to be adjusted. On the other hand, if the scale is adjusted very roughly, it is possible to adjust it quickly, but the image may look awkward since the brightness difference of the thermal image data is large. Therefore, by adjusting the histogram stretching scale with predetermined scales, it is possible to adjust the histogram stretching scale naturally within an appropriate time. The scale may vary depending on the environment to which the thermal image data is applied, and may be set by the user through a user interface (not shown). According to an exemplary embodiment, the user interface may be implemented by a screen having a touch pad function, a mouse, and/or a key board.

Figure 5:
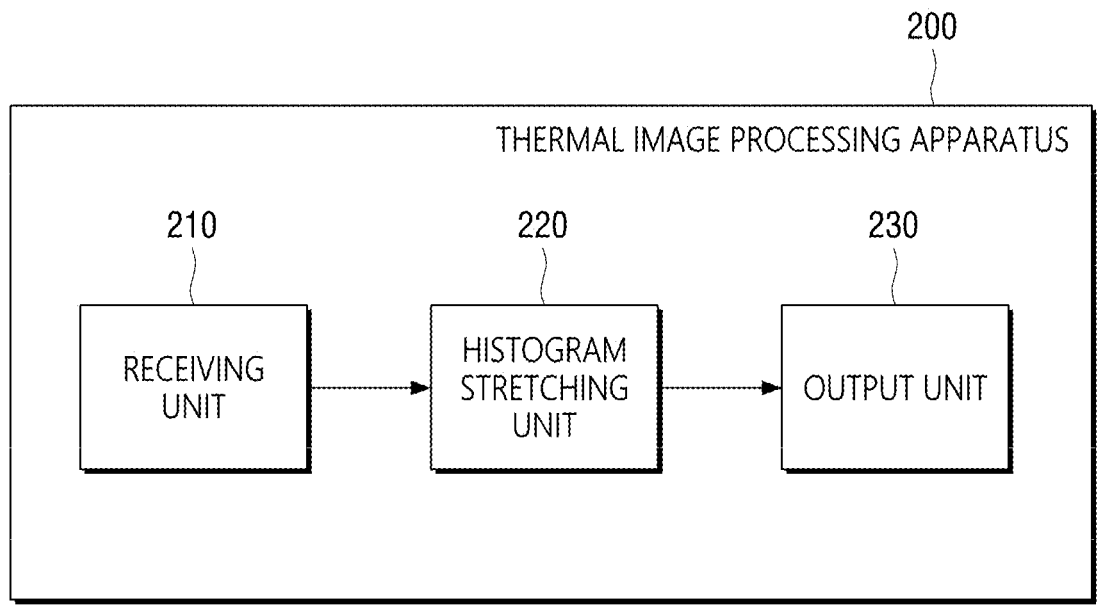
FIG. 5 is a block diagram of an apparatus for processing a thermal image according to an exemplary embodiment.

FIG. 5 illustrates a thermal image processing apparatus 200 according to an exemplary embodiment, which may include a receiver 210, a histogram stretching unit 220, and a transmitter 230.

The receiver 210 may receive thermal image data. The histogram stretching unit 220 may perform histogram stretching on the thermal image data, and may adjust the histogram stretching scale using the histogram data of the thermal image data. The histogram stretching unit and the histogram stretching scale adjusting unit may be implemented as separate modules as described above or may be implemented as a single module as shown in FIG. 5. The transmitter 230 may output an image on which the histogram stretching has been performed.

Figure 6:
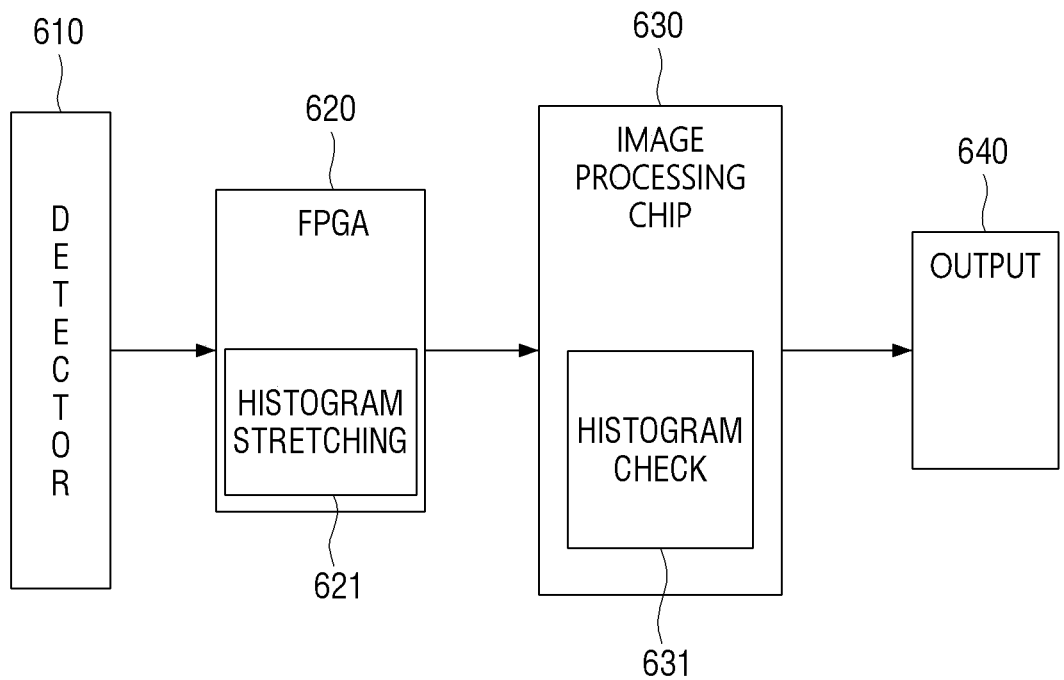
FIGS. 6 and 7 are block diagrams of apparatus for processing a thermal image according to exemplary embodiments.

The processes of receiving, processing and outputting the thermal image data may be performed by using a thermal image processing apparatus shown in FIG. 6. Referring to FIG. 6, image data received through a detector 610 undergoes a histogram stretching process in a field-programmable gate array (FPGA) 620. A histogram stretching block 621 included in the FPGA 620 increases the contrast of an image by evenly spreading the histogram distribution level.

Figure 7:
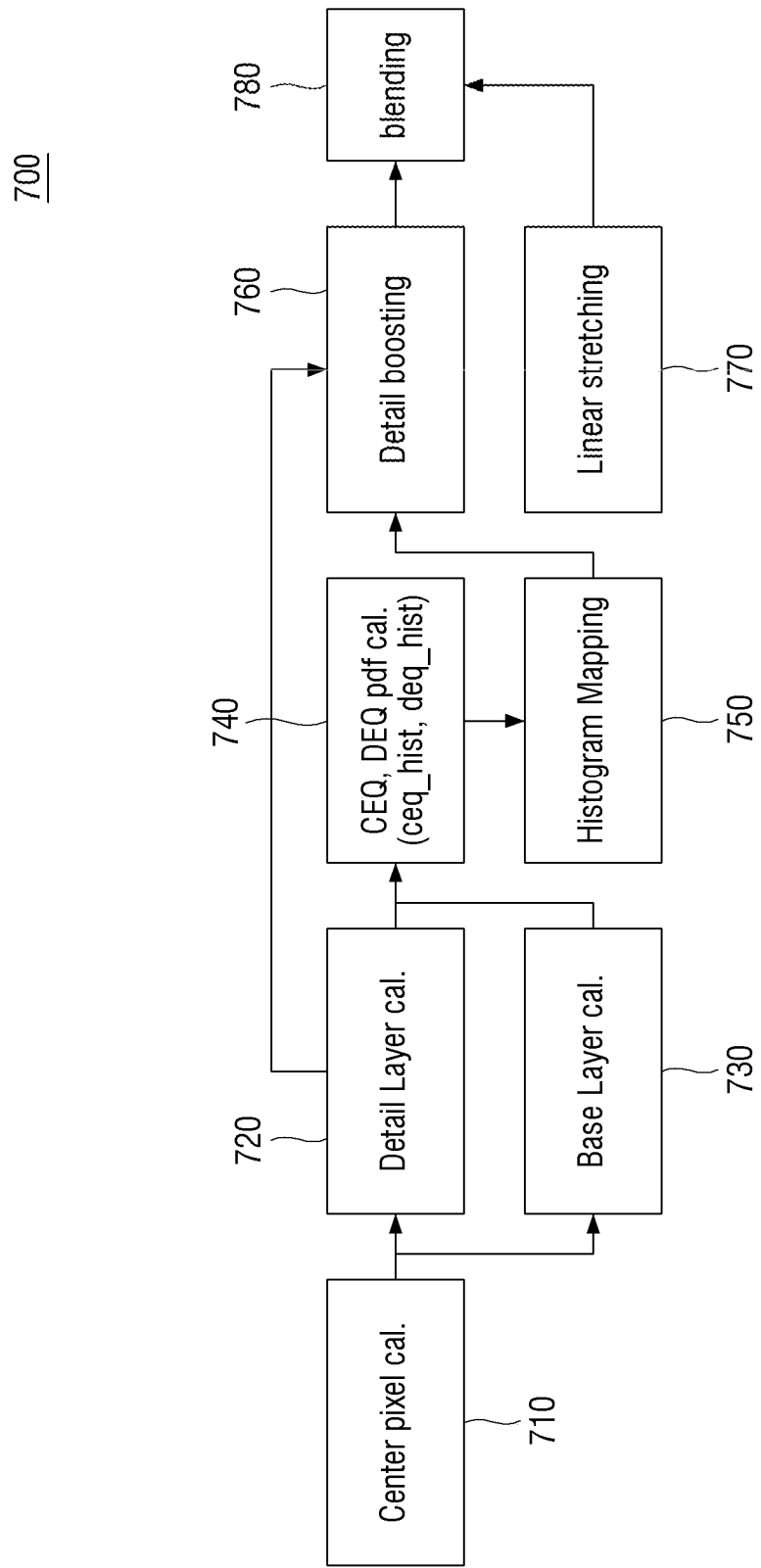

FIG. 7 illustrates a histogram stretching block according to an exemplary embodiment. Referring to FIG. 7, a histogram stretching block 700 may perform histogram stretching by center pixel calculation 710, detail layer calculation 720, base layer calculation 730, Contrast Limited Histogram Equalization (CEQ) and Detail Layer based Histogram Equalization (DEQ) Probability Density Function (PDF) calculation 740, histogram mapping 750, detail boosting 760, linear stretching 770 and blending 780.

Referring back to FIG. 6, after an image is subjected to histogram stretching, the image is input to an image processor 630, which may be implemented in a system on chip (SoC), and further processed to be output through a transmitter 640. In doing so, in order to control the histogram stretching scale in the image processor 630, a process of checking a histogram distribution of an output screen is performed in a histogram check block 631 included in the image processor 630. In the histogram distribution, it is determined whether the image is saturated or deteriorated based on the minimum value, and the histogram stretching scale of the FPGA 620 is adjusted.

Figure 8:
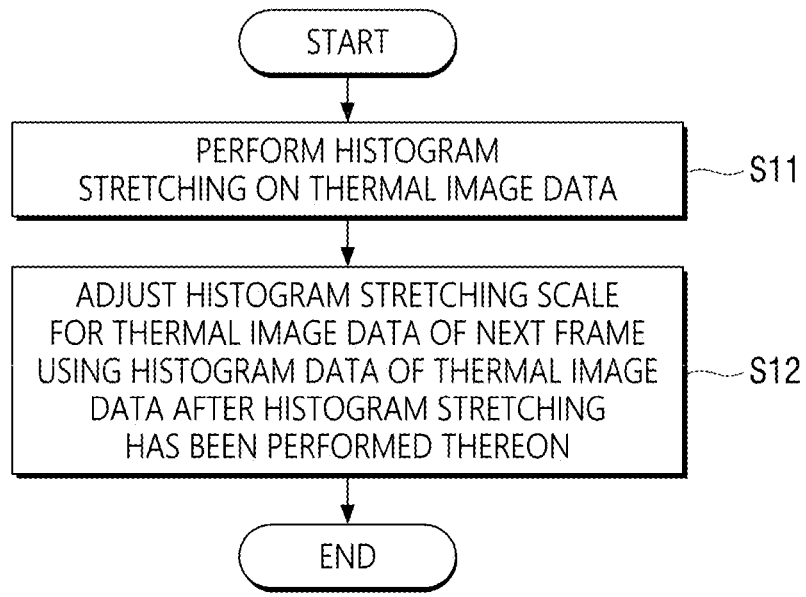
FIG. 8 is a flowchart for illustrating a method of processing thermal image according to an exemplary embodiment.
Figure 9:
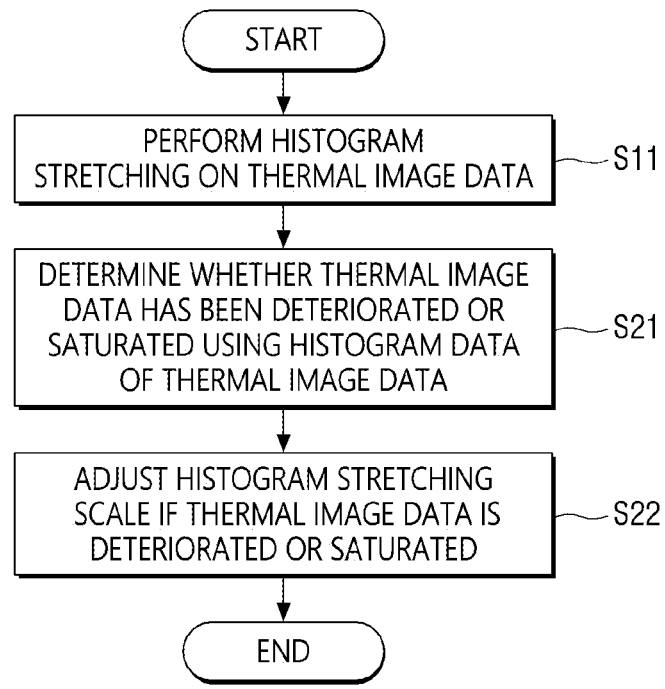
FIGS. 9 and 10 are flowcharts for illustrating methods of processing a thermal image according to exemplary embodiments.
Figure 10:
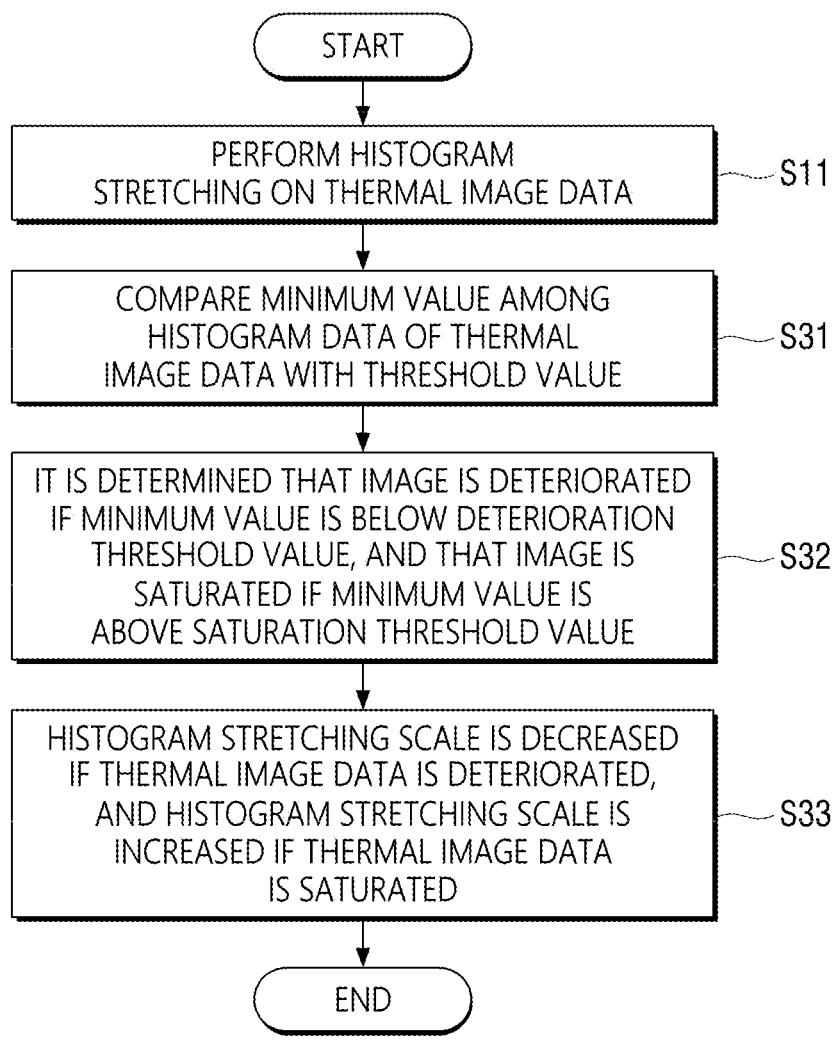

FIG. 8 is a flowchart for illustrating a method for processing thermal image according to an exemplary embodiment. FIGS. 9 and 10 are flowcharts for illustrating methods of processing a thermal image according to exemplary embodiments. The method according to the exemplary embodiment is performed by the apparatus describe above with reference to FIGS. 1 to 7, and therefore, each step will be described briefly to avoid redundancy.

In performing thermal image processing, histogram stretching is performed on thermal image data (S11). Subsequently, a histogram stretching scale on thermal image data of a next frame is adjusted using histogram data of the thermal image data on which the histogram stretching has been performed (S12).

Operation S12 may include determining whether the thermal image data is deteriorated or saturated using the histogram data of the thermal image data (S21), and adjusting the histogram stretching scale if the thermal image data is deteriorated or saturated (S22).

Operation S21 of determining whether the thermal image data is deteriorated or saturated may include comparing the minimum value among the histogram data of the thermal image data with threshold values (S31), determining that the thermal image data is deteriorated if the minimum value is below a deterioration threshold value and that the thermal image data is saturated if the minimum value is above a saturation threshold value (S32), and increasing the histogram stretching scale if it is determined that the thermal image data is deteriorated, and decreasing the histogram stretching scale if it is determined that the thermal image data is saturated (S33).

The histogram stretching scale may be adjusted at every predetermined number of frames or at a predetermined interval. The histogram stretching scale may be adjusted for thermal image data of the next frame or may be adjusted with a predetermined scale.

The exemplary embodiments may be implemented in a form of program commands capable of being performed through various computer components to thereby be recordable in a computer-readable recording medium. The computer-readable medium may include program instructions, data files, data structure or the like alone or a combination thereof. The program instructions stored on the medium may be ones specially configured for the present disclosure or any ones well known and available to those skilled in the field of computer software. Examples of the computer-readable storage medium may include magnetic media such as a hard disk, a floppy disk and a magnetic tape; optical media such as a compact disk read-only memory (CD-ROM) and a digital versatile disc (DVD); magneto-optical media such as a floptical disk; and hardware devices specially configured to store and execute program instructions, such as a ROM, a random access memory (RAM), a flash memory or the like. In addition, the computer-readable storage medium may be implemented in the form of a carrier wave, e.g. transmission via Internet. In addition, the computer-readable storage medium may be distributed in computer systems connected with one another over a network, such that computer-readable codes may be stored and executed in a distributed manner. Functional programs, codes and code segments for embodying the exemplary embodiments may be easily deduced by computer programmers in the art. Examples of the program instructions may include machine language codes such as ones being made by compilers as well as high-level language codes capable of being executed by computers using interpreters or the like. The hardware devices may be configured to be operated as one or more software modules to perform operations according to the exemplary embodiments, or vise versa.

At least one of the components, elements, modules or units (collectively "components" in this paragraph) represented by a block in the drawings may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

It will be evident to those skilled in the art that various modifications and changes may be made in the exemplary embodiments without departing from the technical idea or the gist of the inventive concept. Therefore, it should be understood that the above-mentioned embodiments are not limiting but illustrative in all aspects. It should be understood that the drawings and the detailed description are not intended to limit the inventive concept to the particular forms disclosed herein, but on the contrary, the intention is to cover all modifications, equivalents, and alternatives falling within the spirit and scope of the inventive concept as defined by the appended claims.

What is claimed is:

1. A method for processing a thermal image, the method comprising:
  performing histogram stretching on thermal image data of a current frame to obtain stretched thermal image data; and
  adjusting a histogram stretching scale for thermal image data of a next frame based on a comparison between histogram data of the stretched thermal image data of the current frame and a plurality of threshold values,
  wherein the plurality of threshold values comprise at least one from among a deterioration threshold value and a saturation threshold value,
  wherein the adjusting the histogram stretching scale comprises at least one from among increasing the histogram stretching scale based on determining that the stretched thermal image data is deteriorated, and decreasing the histogram stretching scale based on determining that it the stretched thermal image data is saturated.

2. The method of claim 1, wherein the adjusting the histogram stretching scale comprises:
  determining whether the stretched thermal image data is deteriorated or saturated using the histogram data of the stretched thermal image data; and
  adjusting the histogram stretching scale in response to determining that the thermal image data is deteriorated or saturated.

3. The method of claim 2, wherein the determining whether the stretched thermal image data is deteriorated or saturated comprises:
  comparing a minimum value of the histogram data of the stretched thermal image data with at least one threshold value.

4. The method for claim 3, wherein the determining whether the stretched thermal image data is deteriorated or saturated comprises:
  determining that the stretched thermal image data is deteriorated if the minimum value is below the deterioration threshold value; and
  determining that the stretched thermal image data is saturated if the minimum value is above the saturation threshold value.

5. The method of claim 4, wherein the adjusting the histogram stretching scale comprises:
  increasing the histogram stretching scale by increasing the deterioration threshold value in response to determining that the stretched thermal image data is deteriorated; and
  decreasing the histogram stretching scale by decreasing the saturation threshold value in response to determining that the stretched thermal image data is saturated.

6. The method of claim 1, wherein the adjusting the histogram stretching scale is performed at every predetermined number of frames or at a predetermined interval.

7. The method of claim 6, wherein the predetermined number of frames or the predetermined interval is set to be adjusted based on a temperature change of an area of the current frame.

8. The method of claim 1, wherein the adjusting the histogram stretching scale comprises adjusting the histogram stretching scale with a predetermined scale.

9. The method of claim 1, wherein the adjusting the histogram stretching scale is performed differently according to a temperature change of an area of the current frame.

10. An apparatus for processing a thermal image, the apparatus comprising:
  at least one processor configured to:
    perform histogram stretching on thermal image data of a current frame to obtain stretched thermal image data; and
    adjust a histogram stretching scale for thermal image data of a next frame based on a comparison between histogram data of the stretched thermal image data of the current frame and a plurality of threshold values,
  wherein the plurality of threshold values comprise at least one from among a deterioration threshold value and a saturation threshold value, and
  wherein the at least one processor is further configured to increase the histogram stretching scale in response to determining that the stretched thermal image data is deteriorated, and decrease the histogram stretching scale in response to determining that the stretched thermal image data is saturated.

11. The apparatus of claim 10, wherein the at least one processor is further configured to determine whether the stretched thermal image data is deteriorated or saturated using the histogram data of the thermal image data, and adjusts the histogram stretching scale in response to determining that the thermal image data is deteriorated or saturated.

12. The apparatus of claim 11, wherein the at least one processor is further configured to determine whether the stretched thermal image data is deteriorated or saturated by comparing a minimum value of the histogram data of the stretched thermal image data with at least one threshold value.

13. The apparatus of claim 12, wherein the at least one processor is further configured to determine that the stretched thermal image data is deteriorated if the minimum value is below the deterioration threshold value, determines that the stretched thermal image data is saturated if the minimum value is above the saturation threshold value.

14. The apparatus of claim 13, wherein the at least one processor is further configured to increase the histogram stretching scale by increasing the deterioration threshold value in response to determining that the stretched thermal image data is deteriorated, and decrease the histogram stretching scale by decreasing the saturation threshold value in response to determining that the stretched thermal image data is saturated.

15. The apparatus of claim 10, wherein the at least one processor is further configured to determine whether the stretched thermal image data is deteriorated or saturated at every predetermined number of frames or at a predetermined interval.

16. The apparatus of claim 15, wherein the predetermined number of frames or the predetermined interval is set to be adjusted based on a temperature change of an area of the current frame.

17. The apparatus of claim 10, wherein the at least one processor is further configured to adjust the histogram stretching scale with a predetermined scale.

18. An apparatus for processing a thermal image, the apparatus comprising:

a receiver configured to receive thermal image data of a current frame;

at least one processor configured to perform histogram stretching on the thermal image data of the current frame to obtain stretched thermal image data; and a transmitter configured to output an image on which the histogram stretching has been performed, wherein the at least one processor is further configured to adjust a histogram stretching scale for thermal image data of a next frame based on a comparison between histogram data of the stretched thermal image data of the current frame and a plurality of threshold values, wherein the plurality of threshold values comprise at least one from among a deterioration threshold value and a saturation threshold value, and wherein the at least one processor is further configured to increase the histogram stretching scale in response to determining that the stretched thermal image data is deteriorated, and decreases the histogram stretching scale in response to determining that the stretched thermal image data is saturated.

\* \* \* \* \*